United States Patent [19]

Kejr

[11] Patent Number: 4,487,004
[45] Date of Patent: Dec. 11, 1984

[54] COMBINE HARVESTER APPARATUS

[76] Inventor: Melvin P. Kejr, Rte. 1, Brookville, Kans. 67425

[21] Appl. No.: 500,896

[22] Filed: Jun. 3, 1983

[51] Int. Cl.³ .............. A01D 41/14; A01D 45/30; A01D 55/02
[52] U.S. Cl. .................................. 56/14.4; 56/208; 56/228; 56/297
[58] Field of Search ............ 56/14.4, 14.3, 208, 56/209, 296, 297, 298, 228, 159

[56] References Cited

U.S. PATENT DOCUMENTS

| | | | |
|---|---|---|---|
| 739,693 | 9/1903 | Mann | 56/159 |
| 3,258,901 | 6/1966 | Van der Lely et al. | 56/228 |
| 3,345,808 | 10/1967 | Van der Lely et al. | 56/228 |
| 3,468,107 | 9/1969 | Van der Lely | 56/16.2 |
| 3,508,388 | 4/1970 | Buchholz | 56/297 |
| 3,540,195 | 11/1970 | Van der Lely | 56/14.4 |
| 3,698,164 | 10/1972 | Boone et al. | 56/208 |
| 3,897,838 | 8/1975 | Leedahl et al. | 56/228 |
| 3,908,345 | 9/1975 | Oni et al. | 56/208 |
| 3,953,959 | 5/1976 | Decruyenapore | 56/208 |
| 4,009,555 | 3/1977 | Temple | 56/DIG. 15 |
| 4,136,508 | 1/1979 | Coleman et al. | 56/208 |
| 4,184,314 | 1/1980 | Hobbs | 56/228 |
| 4,198,803 | 4/1980 | Quick et al. | 56/296 |
| 4,409,780 | 10/1983 | Beougher et al. | 56/228 |
| 4,437,295 | 3/1984 | Rock | 56/208 |

Primary Examiner—Paul J. Hirsch
Attorney, Agent, or Firm—Phillip A. Rein

[57] ABSTRACT

This invention relates to a combine harvester apparatus having a cutting mechanism apparatus of this invention connected thereto which may be of substantial length. The cutting mechanism apparatus is divided into three sections being a center platform assembly; a right platform assembly; and a left platform assembly. Each platform assembly is capable of performing a crop harvesting function as having (1) a reel assembly to direct the crop; (2) a sickle assembly to sever the crop; and (3) an auger assembly to carry the severed crop to a center point for elevation into a combine harvesting mechanism. The right and left platform assemblies are pivotally connected to the center platform assembly and adapted to be raised or lowered manually or automatically to compensate for variances in levels of the terrain. Numerous special design features are necessary to allow for this vertical movement while maintaining driving forces between the sickle assemblies; auger assemblies; and the reel assemblies. For example, a special cover reel assembly is provided on each end of the center reel assembly because of gaps created between same and the right and left reel assemblies when raised to an elevated position.

16 Claims, 11 Drawing Figures

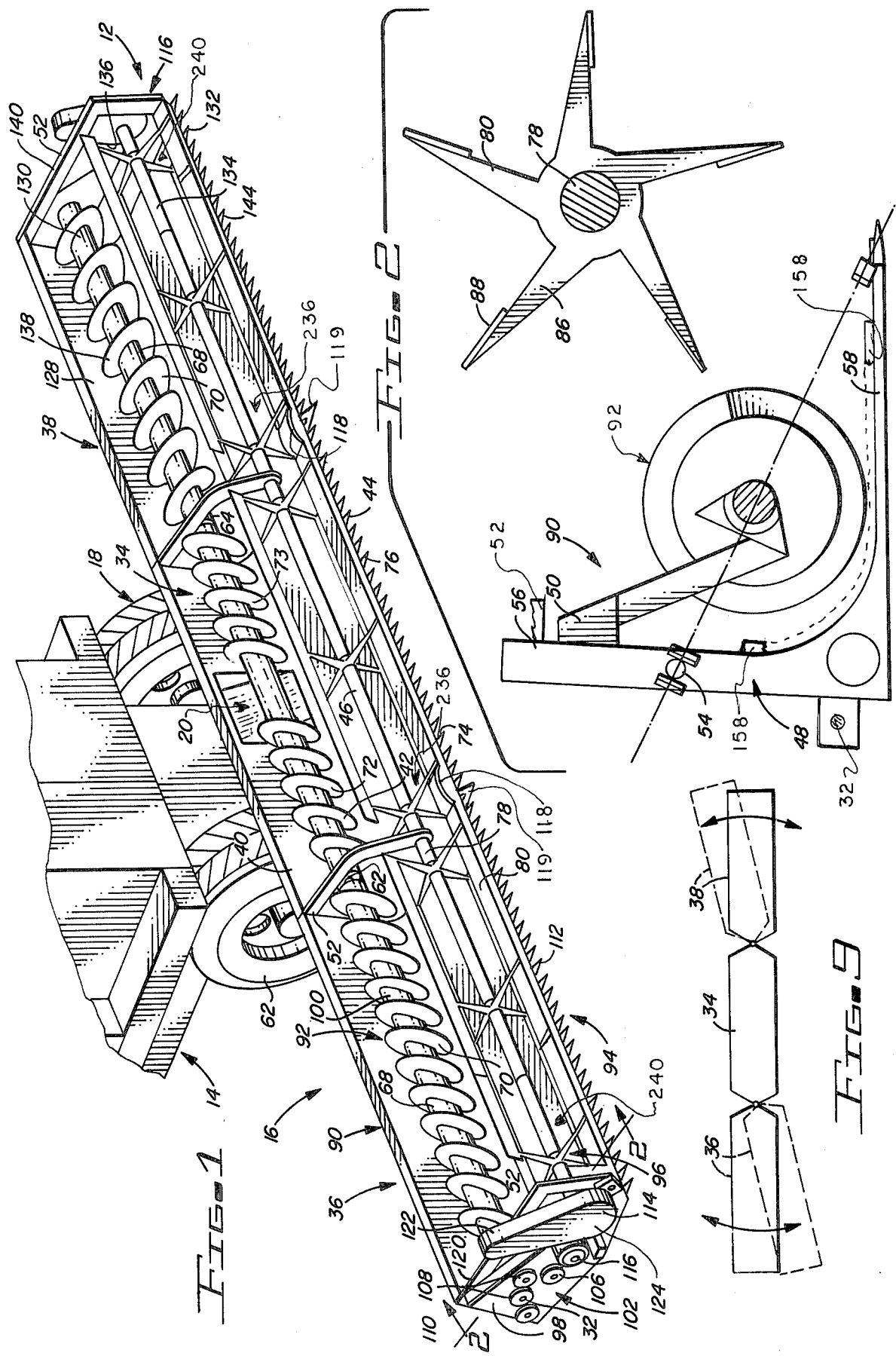

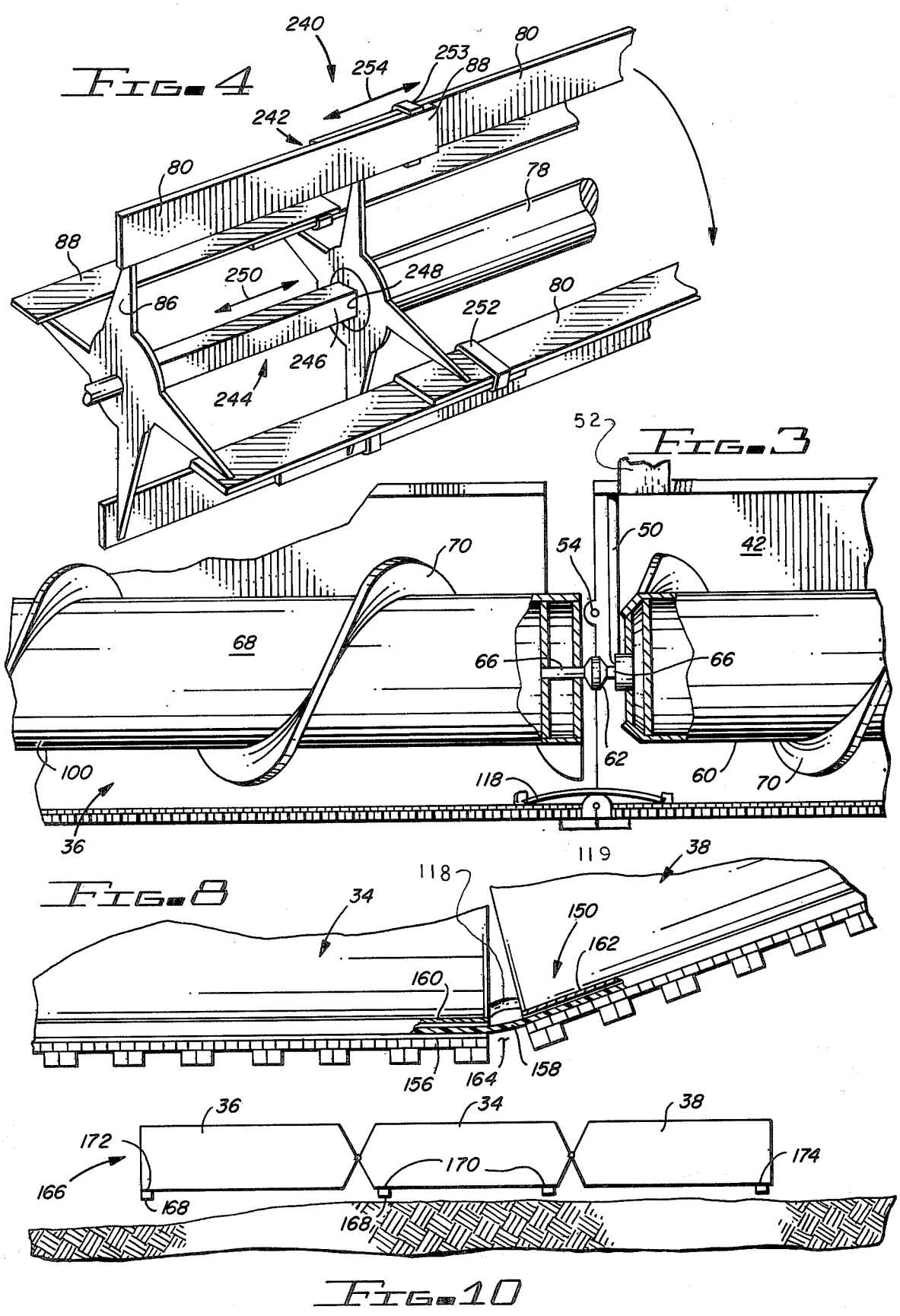

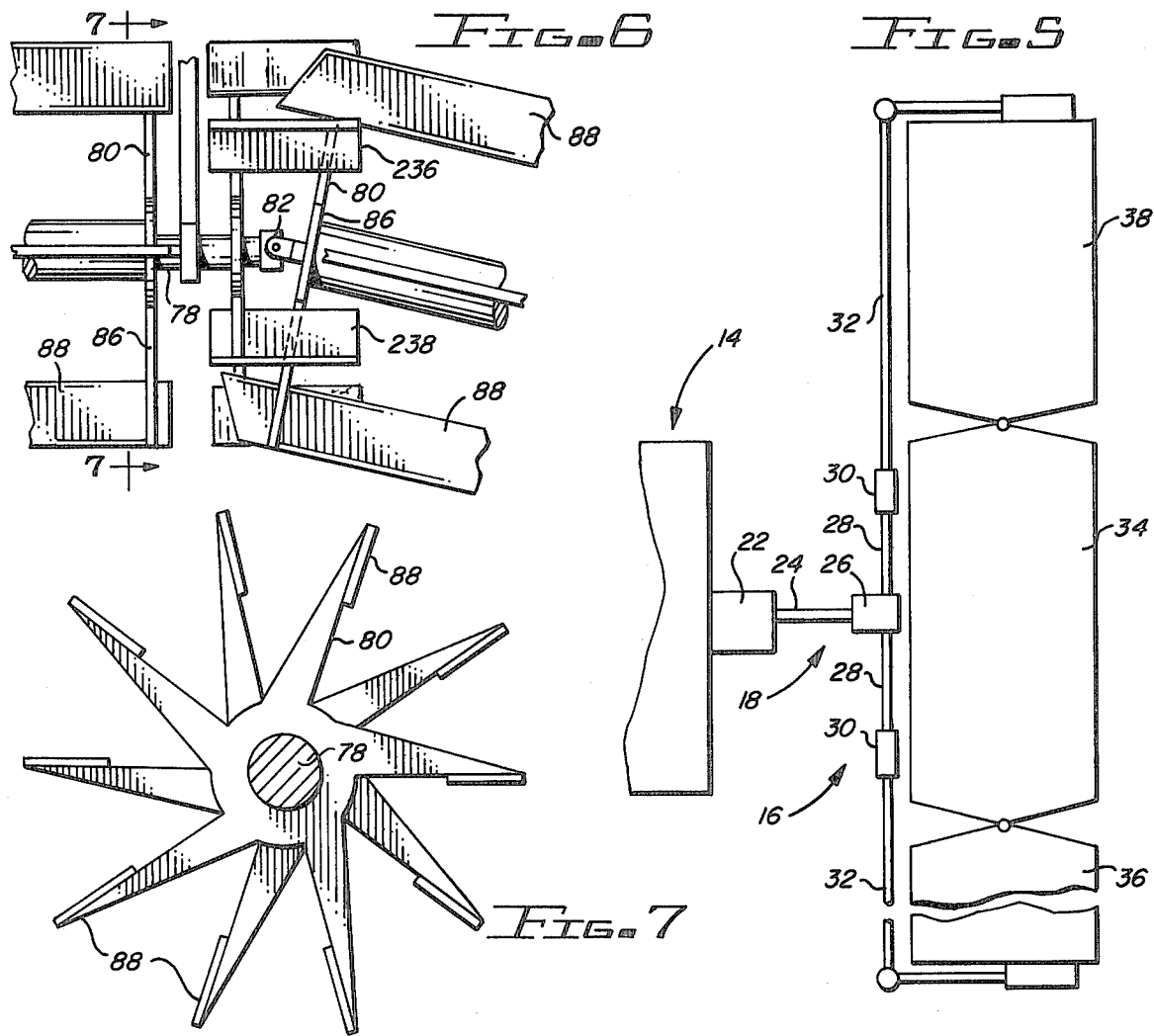
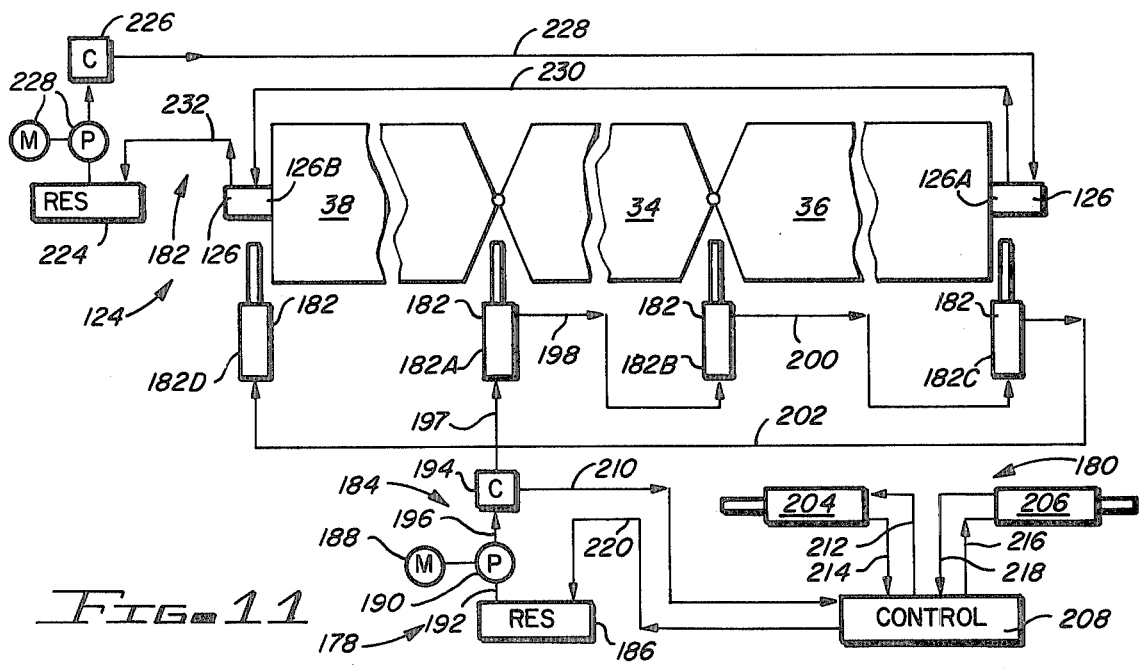

COMBINE HARVESTER APPARATUS

PRIOR ART

A search of the prior art revealed the following U.S. Pat. Nos. 3,953,959; 4,009,555; 3,698,164; 4,136,508.

It is noted that numerous patents were found involving various types of hydraulic and electronic control systems in order to raise and lower a platform cutter structure to compensate for uneven contour of the ground to avoid hitting the surface or rocks and the like. However, our invention involves the use of an extended combine platform structure and having outer left and right wings which can be independently raised and lowered to account for uneven terrain.

The Van der Lely patent discloses right and left movable cutter portions on a combine harvester which can be folded for transport purposes. The Van der Lely patent is mainly concerned with a ground height control system which can vary because of the ground contour but does not achieve the function and operation of our invention.

The Basham patent discloses a harvesting machine having a header or cutting platform which can be tilted in opposite directions to conform to variations in ground contour but is not operable in a manner similar to our invention. The only similarity would appear to be the use of a telescoping drive shaft to compensate for variation in overall length to a fixed position when moving the cutter head to various tilted positions.

PREFERRED EMBODIMENT OF THE INVENTION

In one preferred embodiment of the invention, a combine harvester apparatus is constructed having an elongated cutting mechanism assembly such as 34 feet in length or more and having outer ends thereof in sections which can be manually or automatically adapted to conform to the contour of the ground surface. The combine harvester apparatus is provided with a prime mover or tractor assembly having a cutting mechanism assembly of this invention operable to sever a crop and move the same through an elevator assembly into the tractor assembly. The cutting mechanism assembly includes (1) a center platform assembly secured to the forward portion of the tractor assembly; (2) a right platform assembly secured to the center platform assembly; and (3) a left platform assembly secured to the left side of the center platform assembly. The center platform assembly includes (1) a center support frame; (2) a center auger assembly; (3) a center cutter or sickle assembly; and (4) a center reel assembly. These elements are operable in a conventional matter such as the center reel assembly is operable to hold a crop to be severed; the center sickle assembly severs the crop at a desired distance above the ground surface; and the center auger assembly is operable to move the severed crop to a central position to be picked up by the elevator assembly and moved into a reservoir or storage bin on the tractor assembly. The right and left platform assemblies are substantially identical to each other and the center platform assembly by having a support frame; an auger assembly; a cutter or sickle assembly; and a reel assembly. The right and left platform assemblies are pivotally connected to opposite sides of the center platform assembly so as to allow pivotal movement upwardly or downwardly to compensate for differences in the ground surface or terrain. Therefore, the invention herein lies in the features of the driving the auger assemblies and sickle assemblies while allowing upward and downward pivotal movement. Additionally, the reel assemblies are off-set relative to the pivotal movement of the other features and therefore special structure is necessary to compensate for a lengthening or shortening of the reel assemblies during such pivotal movements. A manual or automatic height sensing system is utilized with the invention whereby the left and right platform assemblies can be independently movable to a pre-determined height from the support surface. A unique sickle cover assembly has been designed in order to cover the separation of the right and left platform assemblies from the center platform assembly when in the raised condition to assure that the severed crop is continually conveyed inwardly by the respective auger assemblies and does not fall through to the support ground surface.

OBJECTS OF THE INVENTION

One object of this invention is to provide a combine harvester apparatus which can be constructed of a substantial overall cutting width and having outer sections which are automatically and independently movable vertically to compensate for changes in the ground surface or terrain.

One other object of this invention is to provide a combine harvester apparatus having a center platform assembly with right and left platform assemblies connected thereto and a height control sensing assembly which is operable to sense variations in the terrain and automatically adjust the right and left platform assemblies so as to maintain a desired height from the ground support surface.

One further object of this invention is to provide a combine harvester apparatus having a cutting mechanism assembly divided into three sections with unique means for driving the auger assembly, cutter assembly, and reel assembly while still permitting independent pivotal movement of the outer sections thereof when being changed to conform to the ground surface contour.

One other object of this invention is to provide a combine harvester apparatus having an elongated oversized cutting mechanism assembly divided into three sections whereby the outer two sections can be folded inwardly and upwardly for transport purposes.

Still, another object of this invention is to provide a combine harvester apparatus having an elongated cutting mechanism assembly and being sturdy in construction, easy to operate; and substantially maintenance free.

Various other objects, advantages, and features of the invention will become apparent to those skilled in the art from the following description, taken in conjunction with the accompanying drawings, in which:

FIGURES OF THE INVENTION

FIG. 1 is a perspective view of the cutting mechanism assembly of this invention as attached to a prime mover or combine tractor assembly;

FIG. 2 is an enlarged fragmentary sectional view taken along line 2—2 in FIG. 1;

FIG. 3 is a fragmentary front elevational view of the cutting mechanism assembly of this invention having portions thereof broken away for clarity;

FIG. 4 is a fragmentary perspective view of a reel assembly of the cutting mechanism assembly of this invention;

FIG. 5 is a schematic diagram showing the cutting power assembly of the combine harvester assembly of this invention;

FIG. 6 is a fragmentary front elevational view of a portion of the reel assemblies of the cutting mechanism of this invention;

FIG. 7 is an enlarged sectional view taken along line 7—7 in FIG. 6;

FIG. 8 is a fragmentary front elevational view illustrating a sickle assembly of this invention and, more particularly, a sickle cover assembly of this invention;

FIG. 9 is a schematic illustration of the independent movement of the outer wing portions of the cutting mechanism assembly of this invention;

FIG. 10 is a schematic illustration of the height control sensor assembly of the cutting mechanism assembly of this invention; and FIG. 11 is a schematic diagram illustrating the hydraulic control system of the combine harvester apparatus of this invention.

The following is a discussion and description of preferred specific embodiments of the combine harvester apparatus and the cutting mechanism assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawing in detail and, in particular to FIG. 1, a combine harvester apparatus of this invention, indicated generally at 12, includes a prime mover or tractor assembly 14 having a cutting mechanism assembly 16 of our invention secured thereto. A cutting power assembly 18 is mounted on the tractor assembly 14 and operable to drive the cutter mechanism assembly 16. An elevator assembly 20 is mounted between the cutter mechanism assembly 16 and the tractor assembly 14 and operable to move the cut crop upwardly into a reservoir or storage bin (not shown) in the tractor assembly 14.

More particularly, the tractor assembly 14 is adapted to receive harvested crop materials such as soybeans or, for example, wheat to separate the stalks or "chaff" from the wheat kernels themselves; to discharge the "chaff" onto the ground; and retain the wheat kernels in the reservoir until such time as it is appropriate to unload the wheat kernels into an awaiting truck or the like.

The elevator assembly 20 is adapted to first receive the harvested crop from the cutting mechanism assembly 16 and feed same into the tractor assembly 14 for the aforementioned operations.

The cutting power assembly 18 includes a power member 22 driven by the power forces from the tractor assembly 18 to drive a chain member 24 connected to a driven sprocket member 26. In turn, the driven sprocket member 26 is mounted on a power shaft member 28 having power sleeve members 30 operable to transmit power through intermediate shaft members 32 to each outer end of the cutting mechanism assembly 16 in a manner to be explained.

The heart of the invention is the cutting mechanism assembly 16 which includes (1) a center header or platform assembly 34; (2) a right header or platform assembly 36; and (3) a left header or platform assembly 38. The center platform assembly 34 is rigidly connected to the tractor assembly 14 but is selectively movable horizontally relative thereto. The right platform assembly 36 and the left platform assembly 38 are both independently pivotal upwardly and downwardly about the center platform assembly 34 in a manner to be explained.

The center platform assembly 34 includes (1) a center support frame 40; (2) a center auger assembly 42; (3) a center cutter or sickle assembly 44; and (4) a center reel assembly 46. The center support frame 40 includes a main support body 48; end auger support arms 50; reel support arms 52; and pivotal connections 54 to connect adjacent support frames in a manner to be described.

The main support body 48 is of L-shape having a vertical leg section 56 integral with a horizontal leg section 58. Connector shafts from the tractor assembly 14 are secured to the vertical leg section 56 and the connector shafts are movable axially and vertically to raise and lower the center platform assembly 34 in a manner to be described.

The center auger assembly 42 includes (1) a center auger member 60 having opposite ends rotatably supported by respective ones of the auger support arms 50; (2) a power connector member 62 connected to a right end of the center auger member 60; and (3) an auger connector member 64 connected to the left end of the center auger member 60.

The center auger member 60 includes a support and drive shaft 66 having a main auger body 68 secured thereto and a spiral fin member 70 on the center auger member 60 consists of left and right hand sections 72 and 73 so that, on rotation, crop material is moved inwardly from each outer end to the elevator assembly 20 for movement into the tractor assembly 14.

The power connector member 62 is connected to the right end of the drive shaft 66 to transmit drive power to the center auger member 60 in a manner to be explained. The power connector member 62 can be a u-joint; ball bearing drive; clutch mechanism; or other known drive mechanisms which transmit power while being pivotal.

The auger connector member 64 is connected to the left end of the drive shaft 66 to allow relative pivotal movement relative to the interconnected left platform assembly 38. The power for the left platform assembly 38 is supplied to the outer end therof as will be explained to drive its cutting and auger structures as will be explained.

The center cutter or sickle assembly 44 includes a pair of center sickle sections 74 and 76 adjacent and overlaped at the center and driven by respective ones of a left sickle assembly and a right sickle assembly as will be explained.

The center reel assembly 46 includes (1) a main reel support shaft 78; (2) spaced reel members 80 secured to the reel support shaft 78; and (3) reel connector members 82 secured to outer respective ends of the main reel support shaft 78. Opposite ends of the main reel support shaft 78 are rotatably supported by the reel support arms 52 which are movable by hydraulics to raise and lower the center reel assembly 46 as will be explained.

The reel members 80 can be of various number (normally 4 or 5) and include support arms 86 having paddle members 88 connected to outer ends and between adjacent ones of the support arms 86. The parallel paddle members 88 are operable to initially contact the crop to be cut to hold for severence by the center sickle assembly 44 and, then, push the severed crop into the center auger assembly 42.

The reel connector members 82 are u-joints or the like which transmit and receive rotational power to the main reel support shaft 78 at both ends in a manner to be explained. The reel connector members 82 permit pivotal movement and are connected to the right platform assembly 36 and the left platform assembly 38 for conjoint rotational movement of the reel assemblies as will be explained.

The right platform assembly 36 is similar to the center platform assembly 34 and identical structure will be noted by the same numerals and resultant description.

The right platform assembly 36 includes (1) a right support frame 90; (2) a right auger assembly 92; (3) a right cutter or sickle assembly 94; and (4) a right reel assembly 96. The right support frame 90 includes a main support body 48; an end wall 98 to support the right auger assembly 92; a reel support arm 52; and the pivotal connector 54 to connect to the adjacent center platform assembly 34.

The main support body 48 is of L-shape having a vertical leg section 56 integral with a horizontal leg section 58.

The right auger assembly 92 includes a right auger member 100 driven by an auger power drive assembly 102. The right auger member 100 includes a support and drive shaft 66 having a main auger body 68 secured thereto and a spiral fin member 70 secured to an outer surface of the main auger body 68. The spiral fin member 70 matches the pitch and direction of the right hand section 72 on the center auger 60 so that, on rotation, the severed crop material is moved inwardly to the elevator assembly 20 and into the tractor assembly 14.

The power connector member 62 is connected to the left end of the support and drive shaft 66 to transmit rotational power between the center auger member 60 and the right auger member 100 while allowing pivotal movement therebetween.

The right end of the support and drive shaft 66 is rotatably mounted in a bearing member in the end wall 98 of the right support frame 90.

The auger connector 64 interconnects the left end of the support and drive shaft 66 of the right auger member 100 to the center auger member 60 for conjoint rotation through the auger power drive assembly 102.

As noted in FIG. 1, the auger power drive assembly 102 includes a sprocket member 106 secured to an outer right end of the support and drive shaft 66 (right auger member 100) and connected by a drive chain 108 to a drive sprocket member 110. The drive sprocket member 110 is connected to the right intermediate shaft member 32 which is driven by the cutting power assembly 18. This provides the rotational power to drive the center auger assembly 42 and the right auger assembly 92.

The right cutter or sickle assembly 94 includes a right sickle member 112 driven by a sickle power drive assembly 114. The left side of the right sickle member 112 is connected to the center sickle section 74 of the center sickle assembly 44 for conjoint cutting movement therewith.

The right sickle member 112 and the center sickle section 74 achieve one-half the cutting action of the entire cutting mechanism assembly 16. The sickle members are substantially identical having cutter bars used to sever the crop at the desired height.

The sickle power drive assembly 114 includes a power input assembly 116 secured to the right end of the right sickle member 112 and a power connector link 118 used to pivotally interconnect the right sickle member 112 to the center sickle section 74. The power connector link 118 moves laterally with the cutter bars in a reciprocating movement and being adjustable in length. The power connector link 118 is movable vertically to allow for vertical pivotal movement of the right platform assembly 36 about the center platform assembly 34 while maintaining cutting action by the right sickle assembly 94.

The junction of the right sickle member 112 and the center sickle section 174 is provided with a pointed crop separator 119 to assure all the crop is severed at this junction point.

The power input assembly 116 includes a wobble drive member 120 connected to the right sickle member 112 and driven by a sprocket 122 and chain 124, which is connected by a sprocket member to the intermediate shaft member 32. The wobble drive member 120 is of a known type used to impart recriprocating movement to the cutter bars of the right sickle member 112 and center sickle section 74.

The right reel assembly 96 includes (1) a main reel support shaft 78; (2) spaced reel members 80 secured to the reel support shaft 78; (3) a reel support connector member 82 for connection to the main reel support shaft 78 of the center reel assembly 46; and (4) a reel power drive assembly 124 connected to the outer end of the main reel support shaft 78.

The reel members 80 include support arms 86 having the paddle members 88 connected to outer ends thereof.

The reel power drive assembly 124 includes a drive member 126 connected to the reel support shaft 78 to rotate same. The drive member 126 is preferrably a hydraulic motor connected in series with a similar hydraulic motor on the left platform assembly 38.

The left platform assembly 38, similar to the right platform assembly 36, includes (1) a left support frame 128; (2) a left auger assembly 130; (3) a left cutter or sickle assembly 132; and (4) a left reel assembly 134. The left support frame 128 includes a main support body 48; an end wall 136 to support the left auger assembly 130; a reel support arm 52; and the pivotal connector 54 to connect to the adjacent center platform assembly 34.

The left auger assembly 130 includes a left auger member 138 driven by an auger power drive assembly 140. The left auger member 138 includes a support and drive shaft 66 having a main auger body 68 secured to an outer surface of the main auger body 68. The spiral fin member 70 matches the pitch and direction of the left hand section 76 on the center auger 60 so that, on rotation, the severed crop material is moved inwardly to the elevator assembly 20 and into the tractor assembly 14.

The auger connector member 64 interconnects the right end of the support and drive shaft 66 of the left platform assembly 38 to allow relative rotational and pivotal movement.

The left end of the support and drive shaft 66 is rotatably mounted in a bearing member in the end wall 136 of the left support frame 128.

The auger power drive assembly 140 is substantially identical to the previously described auger power drive assembly 102 with the sprocket member 106, drive chain 108, and drive sprocket member 110. The drive sprocket member 110 is connected to the left intermediate shaft member 32 which is driven by the cutting power assembly 18. This provides the rotational power to drive the left auger assembly 130.

The left cutter or sickle assembly 132 includes a left sickle member 144 driven by a sickle power drive assembly 146. The right side of the left sickle member 144 is connected to the center sickle section 76 of the center sickle assembly 44 for conjoint cutting movement therewith.

The junction of the left sickle member 132 and the center sickle section 174 is provided with a pointed crop separator 119 to assure all the crop is severed at this junction point.

The left sickle member 144 and the center sickle section 76 achieves the other half of the cutting action of the cutting mechanism assembly 16.

The sickle power drive assembly 146 includes a power input assembly 116 secured to a left end of the left sickle member 144 and a power connector link 118 to pivotally interconnect the left sickle member 144 to the center sickle section 76. The power input assembly 116 and power connector link 118 have been previously described.

The left reel assembly 134 includes (1) a main reel support shaft 78; (2) special reel members 80 secured to the reel support shaft 78; (3) a reel support connector member 82; for connection to the main reel support shaft 78 of the center reel assembly 46; and, (4) a reel power drive assembly 124 connected to an outer end of the subject reel support shaft 78.

The reel members 80 and the reel power drive assembly 124 have been previously described.

As shown in FIG. 8 of the drawings; it is obvious that a gap will occur in the bottom walls of the support frames of the right platform assembly 36 and the left platform assembly 38 when these items are raised which would allow crop material to fall through.

This is remedied by a sickle cover assembly 150 mounted between each junction of the center platform assembly 34 with the right and left platform assemblies 36 and 38. Each sickle cover assembly 150 includes a housing assembly 156 with a flexible cover member 158 mounted therein. The housing assembly 156 includes left and right housing members 160 and 162 with the cover member 158 anchored in the left housing member 160 and slidably mounted in the right housing member 162.

The cover member 158 can be made of a flexible plastic material that would allow it to bend to cover the gap indicated at 164 to prevent grain and the like from falling through the gap 164.

It is desired to use a height control system to regulate manually and/or automatically the height of the right and left platform assemblies 36 and 38 relative to the center platform assembly 34. The following U.S. patents disclose combine height sensing systems that could be used with my invention:

U.S. Pat. Nos. 3,953,959: HEADER HEIGHT CONTROL MECHANISM
4,009,555: HEIGHT CONTROL FOR COMBINE HEADERS
3,698,164: AUTOMATIC HEADER HEIGHT CONTROL SENSED FROM FLOATING CROP ENGAGING MECHANISM
4,136,508: CLOSED-LOOP COMBINE HEADER HEIGHT CONTROL

As shown in FIG. 10 a height and control sensor assembly 166 is utilized having sensor members 168 mounted to read the distance of the platform assemblies, 34, 36, and 38 above the ground. More particularly, the sensor members 168 include a pair of center sensors 170; a left sensor 177; and a right sensor 174.

The center sensors 170 are secured to a bottom surface of the center platform assembly 34 and can be set to a desired height such as 9 inches above the ground. The left and right sensors 172 and 174 are connected to the outer ends of the left and right platform assemblies 38 and 36 to sense their respective heights above the ground surface.

The left and right sensors 172 and 174 can be set to match the center sensors at 9 inches above ground level and set to automatically pivotally move the right and left platform assemblies 36 and 38 to compensate for uneven ground surface.

Also, the sensors can be set for uneven heights such as 11 inches, 9 inches, and 8 inches, depending on the terrain and automatically maintain these heights.

On referring to FIG. 11, the control system for the invention involves (1) a reel lift system 178; (2) a platform pivot system 180; and (3) a reel drive system 182.

The reel lift system 178 includes a piston and cylinder member 182 mounted on and between each reel support arm 52 and the support frames 40, 90, 128, and operable to raise and lower all of the described reel assemblies conjointly. The reel lift system 178 further includes a hydraulic assembly 184 having a fluid reservoir 186; a motor member 188; and a pump member 190.

The piston and cylinder members 182 are interconnected in series as fluid is (1) supplied to the pump member 190 by a line 192; (2) fed through a control valve 194 by a line 196; (3) by line 197 to piston and cylinder member 182A; (4) line 198 to piston and cylinder member 182B; (5) line 200 to piston and cylinder member 182C; and (6) line 202 to piston and cylinder member 182D.

The piston and cylinder members 182A-D are individually sized to achieve equal piston movement to raise the reel assemblies identical amounts. The pressure fluid is used to raise the reel assemblies and lowered by the weight of the reel assemblies wherein the control valve 194 allows bleeding of fluid into the reservoir.

The platform pivot system 180 includes left and right platform piston and cylinder members 204 and 206 connected to the center platform assembly 34 and to respective ones of the right and left platform assemblies 36 and 38. The piston and cylinder members 204 and 206 are positively movable in both directions to move the respective right and left platform assemblies 36 and 38 up and down.

The platform pivot system 180 further includes a control valve 208 which may be part of the height and control sensor assembly 116 which is connected between the reel lift system 178 and the piston and cylinder members 204 and 206.

More particularly, the control valve 208 is supplied pressure fluid from the pump member 190 and control valve 194 by a line 210. The control valve 208 selectively supplies pressure fluid through lines 212 and 214 to the left piston and cylinder member 204. Similarly, the control valve 208 selectively supplies pressure fluid through lines 216 and 218 to the right piston and cylinder member 206. The pressure fluid being removed from the lines 212, 214, 216, or 218, and bled back through the control valve 208 and line 220 to the fluid reservoir 186. The control valve 208 can be controlled by the sensing system to regulate movement of the right and left platform assemblies 36 and 38.

The reel drive system 182 includes a pump and motor member 222 to receive fluid from a reservoir 224 to supply pressure fluid to a control valve 226. The control valve 226 is operable to supply fluid through a line 228 to the right drive member 126A; line 230 to the left drive member 126B; and a return line 232 to the reservoir 224.

It is noted that the main reel support shafts 78 are offset from the pivotal line of the right and left platform assemblies 36 and 38 and, therefore, creates problems in lengthening and shortening during pivotal movement. One problem is a gap caused between the reel members 80 in the outer platform relative to the center platform assembly 34 when in the raised condition plus possible interference of the reel members 80 in the raised or lowered conditions. Another problem is the lengthening and shortening of the reel members 80 and support shafts 78 is solved by the structure shown in FIG. 6.

More particularly as shown in FIG. 6, a cover reel assembly 236 is secured to each outer end of the reel support shaft 78 of the center reel assembly 46. Each cover reel assembly 236 includes shortened reel members 238 connected to the reel support shaft 78. The reel members 238 are placed in the center of the paddle member 88 of the right reel assembly 96 and the left reel assembly 134. This allows for the inclined movement of the right and left reel assemblies without interference.

As shown in FIG. 4, the outer ends of the reel members 80 are connected by a reel and drive extension assembly 240 connected to the respective end walls 98, 136, and adjacent outer ends of the right and left platform assemblies 36 and 38.

More particularly, the reel and drive extension assembly 240 includes a reel extension 242 and a drive shaft extension 244. The drive shaft extension 244 includes a square hole 248 in adjacent ends of the reel support shafts 78. This allows for axial relative movement of the drive shaft 246 and reel support shaft 78 as shown by arrow 250 while still imparting power drive therebetween.

The drive shaft 246 has the reel extension 242 connected to an outer end thereof. The reel extension 242 includes support arms 86 having paddle members 88 connected to outer ends thereof. Slip connectors 252 are used to interconnect adjacent ones of the paddle members 88 for relative axial movement as shown by an arrow 254.

USE AND OPERATION OF THE INVENTION

In the use of the combine harvester apparatus 12 of this invention, it is noted that the combination of the center platform assembly 34 on the tractor assembly 14 resembles in appearance and usage a conventional combine structure. The addition of the right and left platform assemblies 36 and 38 makes the cutting mechanism assembly 16 have a width of approximately 34 feet. The right and left platform assemblies 36 and 38 can be moved to a substantially vertical position for transport purposes on roads, highways, etc.

It is noted that the cutting mechanism assembly 16 can be constructed of various widths such as 26, 30, 34, and 38 and utilized to harvest various crops such as soybeans, wheat, etc.

On usage, the cutting mechanism assembly 16 is placed in the general horizontal condition of FIG. 1. The operator would occupy a seat in the tractor assembly 14 with the hydraulic control levers at his disposal. The hydraulic control 194 is actuated by the operator to raise and lower the center reel assembly 34; right reel assembly 36; and the left reel assembly 38 conjointly to the proper height depending on the crop and its condition.

The height and control sensor assembly 166 is actuated to place the platform assemblies 34, 36, and 38 at the proper height off the ground or support surface such as 8 inches to assure holding the platform assemblies 36 and 38 in their desired positions. The sensor members 168 could be ultrasonic of photoelectric and the reading of each shown on a digital readout control box. If desired, the left sensor 172 and right sensor 174 could be independently set at desired heights such as 7 inches and 10 inches. The height and control sensor assembly 166 could be a mini-computer and operate to maintain automatically the set heights of 7–8–10-inches of the platform assemblies 34, 36, and 38 above the support surface.

The automatic compensation type controls are known in the prior art as shown by the previously mentioned United States Patents. The mini-computer would act similar to an automatic pilot system on an airplane.

The control 208 would have manual levers that would allow the operator to independently operate the piston and cylinder assemblies 204 and 206 to raise and lower the right and left platform assemblies 36 and 38 if so desired. The piston and cylinder assembly 204 and 206 are moved positively in both directions by pressure fluid.

On proceeding to the crop to be harvested, the reel assemblies 46, 96, and 134 act to push the crop toward the center sickle assembly 44, right sickle assembly 94, and the left sickle assembly 132 for severance by the cutter bars. The severed crop is carried by the reel assemblies 46, 96, 134 into respective ones of the center auger assembly 42 the right auger assembly 92; and the left auger assembly 130 where it is carried by the spiral fin members 70 centrally to the elevator assembly 20. The severed crop is then elevated into the threshing portion of the tractor assembly 14 where the "chaff" and the grain are separated.

The placement of the pivotal points of the auger assemblies 42, 92, and 130; the sickle assemblies 44, 94, and 132; and the pivot connectors 54 in a common plane 240 allows for the upward, forwardly pivotal movement of the right and left platform assemblies 36 and 38. It is noted that the pivot points of the reel assembleis 46, 96, and 134 are not in the common plane 240 which requires the structure shown in FIG. 4 to compensate for lengthening and shortening of the right reel assembly 96 and the left reel assembly 134.

More particularly, the outer ends of the reel support shafts 78 have a square hole 248 therein to receive the drive shaft extension 244 therein. This allows for transfer of rotational force between the reel support shafts 78 and drive shaft extensions 244 plus allowing axial movement of the drive shaft extension 244. This is necessary because of the effective lengthening caused in the reel support shafts 78 on raising and lowering of the right and left platform assemblies 36 and 38.

The cover reel assemblies 236 connected to the center platform assembly 34 are operable to cover a gap created between the respective right and left platform assemblies 36 and 38 when moved to the raised positions. This assures that a paddle member 88 is present to push the crop into the sickle assemblies 44, 94, and 132.

The cutting harvester apparatus of this invention could be manufactured as a new unit or adapted to fit on existing tractor assemblies. The manual or automatic raising and lowering of the right and left platform assemblies is very important to achieve the proper harvesting of crops which vary in height, or may be laying on the ground due to rain or hail, etc.

While the invention has been described in conjunction with preferred specific embodiments thereof, it will be understood that this description is intended to illustrate and not to limit the scope of this invention, which is defined by the following claims.

I claim:

1. In a combine harvester apparatus having a tractor assembly and a forward elevator assembly adapted to receive severed crops and convey same upwardly into the tractor assembly, the invention comprising a cutting mechanism assembly; comprising:
   a. a center platform assembly secured forwardly of the tractor assembly;
   b. another platform assembly pivotally connected to said center platform assembly;
   c. said center platform assembly includes a center support frame; a center auger assembly connected to said support frame; and a center sickle assembly connected to said support frame;
   d. said another platform assembly includes another support frame; and another auger assembly connected to said another support frame; and an another sickle assembly connected to said support frame;
   e. connector means interconnecting said center auger assembly to said another auger assembly for conjoint rotational movement and pivotal movement;
   f. said connector means interconnecting said center sickle assembly to said another sickle assembly for conjoint reciprocal movement and pivotal movement;
   g. power means connected to said another auger assembly to rotate same and to said another sickle assembly to reciprocate same;
   h. control means connected to said center platform assembly and said another platform assembly and operable to pivot said another platform assembly about said center platform assembly; and
   i. said pivotal connections of (1) said another platform assembly to said center platform assembly; (2) said another auger assembly to said center auger assembly to; and (3) said another sickle assembly; to said center sickle assembly all being in a common plane;
   whereby said another platform assembly is pivotal upwardly and downwardly about said pivotal connections in said common plate to compensate for uneven terrain.

2. A cutting mechanism as described in claim 1, wherein:
   a. said another platform assembly having an another reel assembly;
   b. said center platform assembly having a center reel assembly; and
   c. said another reel assembly pivotally and rotatably connected to said center reel assembly by reel connector members.
   whereby said another reel assembly is pivotal upwardly and downwardly about said center real assembly to compensate for uneven terrain.

3. A cutting mechanism as described in claim 2, wherein:
   a. said power means includes a reel power drive assembly connected to said another reel assembly to rotatably drive same;
   b. said another reel assembly includes a reel and drive extension assembly to inerconnect said another reel assembly to said center reel assembly; and
   c. said reel and drive extension assembly transmits rotational movement and permits axial movement of said another reel assembly relative to said center reel assembly.

4. A cutting mechanism as described in claim 1, includes:
   a. still another platform assembly pivotally connected to the other side of said center platform assembly;
   b. said still another platform assembly having a still another auger assembly and a still another sickle assembly;
   c. connector means interconnecting said center auger assembly to said still another auger assembly for conjoint ratational movement and pivotal movement;
   d. said connector means interconnecting said center sickle assembly to said still another sickle assembly for conjoint reciprocal movement and pivotal movement; and
   e. said pivotal connections of (1) said still another platform assembly to said center platform assembly; (2) said still another auger assembly to said center auger assembly; and (3) said still another sickle assembly to said center sickle assembly, all being in an another common plane;
   whereby said still another platform assembly is pivotal upwardly and downwardly about said pivotal connections in said another common plane to compensate for uneven terrain.

5. In a combine harvester apparatus having a tractor assembly and a forward elevator assembly adapted to receive severed crops and convey same upwardly into the tractor assembly, the invention comprising a cutting mechanism assembly; comprising:
   a. a center platform assembly secured forwardly of the tractor assembly;
   b. a right platform assembly pivotally connected to a right side of said center platform assembly;
   c. a left platform assembly pivotally connected to a left side of said center platform assembly;
   d. said center platform assembly includes a center support frame; a center auger assembly rotatably mounted on said center support frame; a center sickle assembly connected to said center support frame; and center reel assembly rotatably mounted on said center support frame;
   e. said right platform assembly includes a right support frame; a right auger assembly rotatably mounted on said right support frame; a right sickle assembly connected to said right support frame; and a right reel assembly rotatably mounted on said right support frame;
   f. said left platform assembly includes a left support frame; a left auger assembly rotatably mounted on said left support frame; a left sickle assembly connected to said left support frame; and a left reel assembly rotatably mounted on said left support frame;
   g. connector means pivotally connecting
      1. said right auger assembly and said left auger assembly to adjacent respective outer ends of said center auger assembly;

2. said right sickle assembly and said left sickle assembly to adjacent respective outer ends of said center sickle assembly;
3. said right reel assembly and said left reel assembly to adjacent respective outer ends of said center reel assembly; and
4. said right support frame and said left support frame to said center support frame;

h. said connector means except for said right reel assembly and said left reel assembly on respective left and right sides of said center platform assembly being in a respective common plane;

whereby said right platform assembly and said left platform assembly are independently pivotal upwardly and downwardly to compensate for uneven terrain.

6. A cutting mechanism as described in claim 5, includes:
   a. auger power means connected to said left auger assembly to rotate same, which, in turn, drives said center auger assembly and said right auger assembly.

7. A cutting mechanism as described in claim 6, wherein:
   a. sickle power means connected to opposite, outer respective ends of said first sickle assembly and said second sickle to recipricate same; and
   b. inner respective ends of said left sickle assembly and said right sickle assembly connected to adjacent sickle sections of said center sickle assembly to independently, reciprocally drive same.

8. A cutting mechanism as described in claim 6, wherein:
   a. said auger power means includes a right auger power means to drive said right auger assembly and said center auger assembly; and a left auger power means to drive said left auger assembly;
whereby a dual auger power supply is provided.

9. A cutting mechanism as described in claim 5, wherein:
   a. said right platform assembly and said left platform assembly pivotal about said connector means to generally vertical positions for transport purposes.

10. A cutting mechanism as described in claim 5, includes:
    a. control means connected between said center platform assembly and said right platform assembly and said left platform assembly to independently pivot same automatically upwardly and downwardly to in response to surface terrain: and
    b. said control means operable to move one or both of said right platform assembly and said left platform assembly to a vertical position and still operate said right, center, and left auger assemblies; said right, center, and left sickle assemblies; and said right, center, and left reel assemblies.

11. A cutting mechanism as described in claim 5, includes:
    a. power means includes a sickle power drive assembly connected to the right end of said right sickle assembly to reciprocate same; and
    b. said sickle power drive assembly having a power drive connector link to transfer reciprocating movement from said right sickle assembly to said center sickle assembly while permitting pivotal vertical movement of said right sickle assembly.

12. A cutting mechanism as described in claim 5, includes:
    a. power means includes a sickle power drive assembly connected to the left end of said left sickle assembly to reciprocate same; and
    b. said sickle power drive assembly having a power drive connector link to transfer reciprocating movement from said left sickle assembly to said center sickle assembly while permitting pivotal vertical movement of said right sickle assembly.

13. A cutting mechanism as described in claim 5, wherein:
    a. said center reel assembly having reel and drive extensions connected to each outer respective ends thereof; and
    b. said reel and drive extensions moveable laterally to increase and decrease the overall effective length of said center reel assembly and convey rotational power to said right reel assembly and said left reel assembly.

14. A cutting mechanism as described in claim 5, wherein:
    a. said right reel assembly and said left reel assembly each having a cover reel assembly connected to ends adjacent said center reel assembly; and
    b. said cover reel assemblies provide a reel structure to cover gaps created when said right reel assembly and said left reel assembly are pivoted upwardly and downwardly relative to said center reel assembly.

15. A cutting mechanism as described in claim 14, wherein:
    a. said cover reel assemblies having shortened reel members placed between paddle members of said right reel assembly and said left reel assembly which allows for inclined movement thereof without physical interference between said shortened reel members and said paddle members.

16. A cutting mechanism as described in claim 14, includes:
    a. a sickle cover assembly is mounted between each junction of said right platform assembly and said left platform assembly to said center platform assembly mounted adjacent said right sickle assembly and said left sickle assembly;
    b. each of said sickle cover assemblies having a cover member to cover a gap created in a lower support surface of said left support frame and said right support frame when moved to inclined positions.

* * * * *

UNITED STATES PATENT AND TRADEMARK OFFICE
CERTIFICATE OF CORRECTION

PATENT NO. : 4,487,004
DATED : December 11, 1984
INVENTOR(S) : Melvin P. Kejr

It is certified that error appears in the above-identified patent and that said Letters Patent is hereby corrected as shown below:

Col. 11, line 53, "plate" should read --plane--.

Signed and Sealed this

Sixth Day of August 1985

[SEAL]

Attest:

DONALD J. QUIGG

Attesting Officer

Acting Commissioner of Patents and Trademarks